INVENTOR.
E. F. PETERSON

ATTORNEY

May 26, 1964 E. F. PETERSON 3,134,564
VIBRATOR MOUNT
Filed July 31, 1961 2 Sheets-Sheet 2
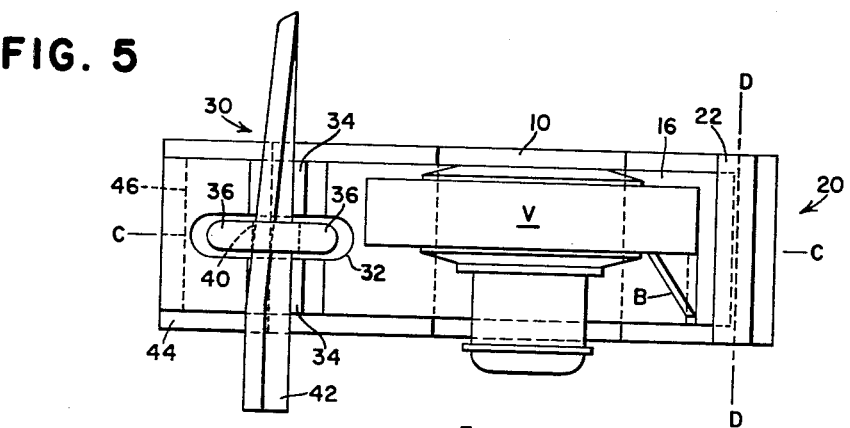
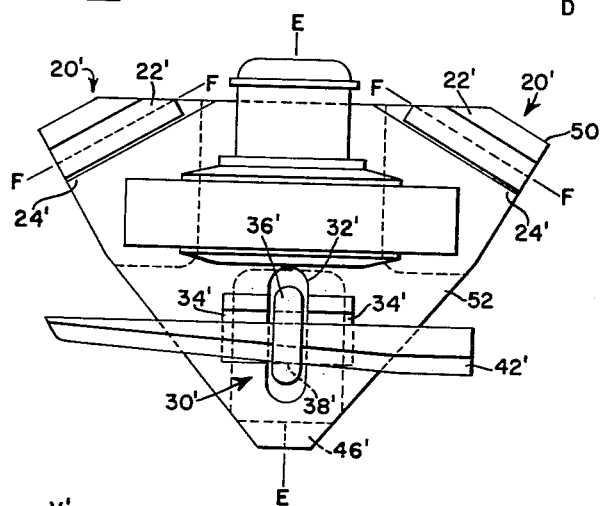
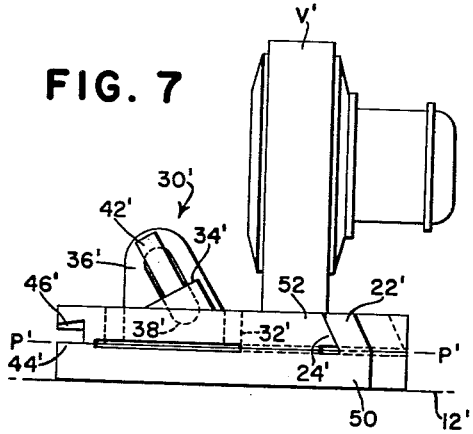
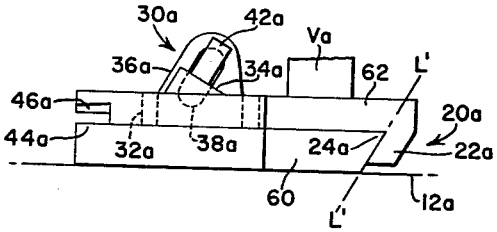
INVENTOR.
E. F. PETERSON
BY
ATTORNEY United States Patent Office 3,134,564
Patented May 26, 1964

3,134,564
VIBRATOR MOUNT
Edwin F. Peterson, % Martin Engineering Co., Neponset, Ill.
Filed July 31, 1961, Ser. No. 127,912
9 Claims. (Cl. 248—19)

This invention relates to means for mounting a vibrator on an object to be vibrated. In the general field of the use of vibrators for facilitating the handling of fluent and other materials, it is common to mount a vibrator on a receptacle, container etc. for the purpose of imparting thereto the vibrational forces developed by the vibrator, thereby expediting the handling of the material.

One of the problems in this field occurs most frequently in the provision of adequate means for mounting the vibrator on the object etc. to be vibrated, and various forms of mounting means have been proposed and used, most of which have enough disadvantages to warrant a continuing quest for improved mountings. One of the requirements is that the mounting be sufficiently sturdy and inexpensive for the purposes involved and subsidiary problems reside in the necessity for mounting not only the vibrator to an intermediate member but for mounting the intermediate member to the object to be vibrated. In the conventional situation, the object to be vibrated will be equipped with a special mounting member to which a base member may be attached, the latter carrying the vibrator. Means should be provided for drawing the two members together so that they in effect become one. At the same time, the members must be capable of separation so that the vibrator may be moved from place to place.

According to the present invention, an improved mounting is provided which comprises a pair of relatively cooperative members having surfaces meeting at a common plane, in combination with abutment and clamp means which operate to draw the two members together to increase the engagement between not only the abutment means but the meeting surfaces. It is a significant object of the invention to accomplish the development of these forces by simple means involving cooperative ramp surfaces and a wedge element which may be manually driven between these surfaces. A still further feature of the invention resides in the provisions of separating means whereby the wedge element may be used also to facilitate separation of the members when the vibrator and its attached base member must be removed from the mounting member. It is a further object of the invention to provide the two cooperative members in the form of simple elements which may be readily produced as forgings, one of the members having an opening therethrough bordered on at least one side by ramp means and the other member having an eye which projects through the opening and beyond the ramp means, having therein a slot which is receivable of a wedge element which coacts between the ramp means and the remote closed end of the slot to develop the necessary forces. A still further object exploits the use on the abutment means of angularly cooperative surfaces related to the common plane of abutment between the two members so as to implement the wedging forces developed by the wedging means.

The foregoing and other important objects and desirable features inherent in and encompassed by the invention will become apparent as preferred embodiments thereof are disclosed in detail in the ensuing description and accompanying sheets of drawings, the figures of which are described below.

FIGURE 5 is a plan of the structure shown in FIGURE 1.

FIGURE 6 is a plan of a modified form of structure including a pair of related and convergent abutment means in association with clamping means of the type shown in FIGURES 1 through 5.

FIGURE 7 is an end elevation of the structure shown in FIGURE 6.

FIGURE 8 is a fragmentary elevation of a modified form of the invention in which the abutment means and clamp means are reversed as respects those shown in the previous figures.

Figure 1:
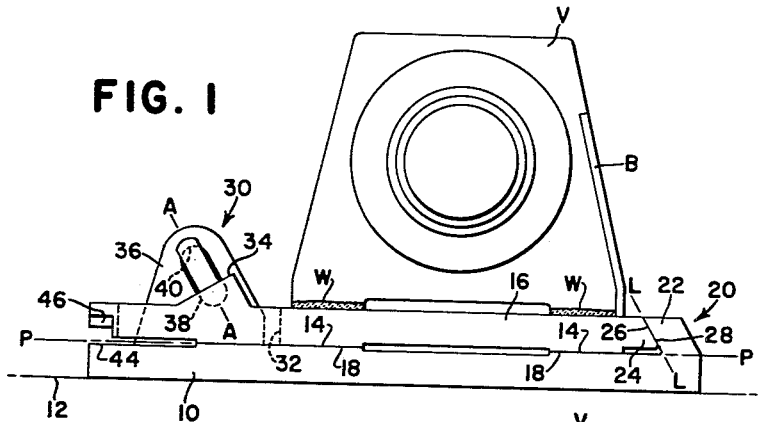
FIGURE 1 is an elevational view of the assembled mounting means as constructed according to one form of the invention.
Figure 2:
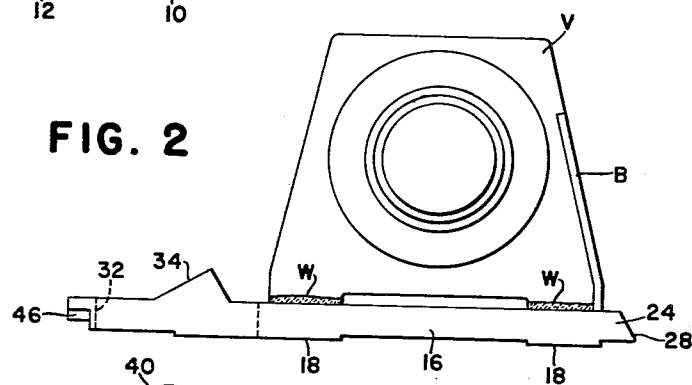
FIGURE 2 shows the base and vibrator separated from the mounting member.
Figure 3:
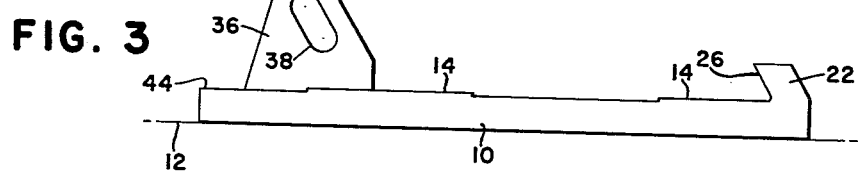
FIGURE 3 shows the mounting member alone.

In FIGURES 1 through 5 there is shown at 10 a mounting member which may be a suitable forging and which is adapted to be affixed to an object to be vibrated, schematically represented at 12. This member may be welded, bolted or otherwise rigidly secured to the object. In instances where the object to be vibrated is relatively large, such as a container, receptacle, hopper car etc., there may be several mounting members such as that shown at 10.

The member 10 in this case is relatively long and narrow and has an outer or upper surface portion providing a pair of flat pads for faces 14 which lie in a common plane. For the present purposes, it will be assumed that this plane is horizontal, but this expression is used only in the interest of convenience and not by way of limitation, since the structure may be used in any of several positions. The two pads 14 may be provided as separate surfaces in order to facilitate machining thereof; that is, it is not necessary to machine the entire upper surface of the plate or member 10.

Cooperative with the member 10 is a base member 16 which may be comparably long and narrow and which has a pair of pads 18 at one surface thereof, here the undersurface, and these again lie in a common horizontal plane. When the two members are jutaposed or assembled, the surfaces represented by the pads 14 and 18 meet in a common horizontal plane, indicated in FIGURE 1 at P—P. Since the surfaces are plainer, it follows that the two members are relatively movable back and forth, but this movement is stopped in one direction by abutment means, indicated in its entirety by the numeral 20 in FIGURE 1. This abutment means comprises cooperative elements 22 and 24 respectively on the members 10 and 16, the former being in the form of an integral lip or claw, which, on the basis of the disclosure shown, inclines upwardly and to the left, projecting above the adjacent pad surface 14, and itself having an inclined abutment surface 26. The abutment element 24 on the member 16 is comparably inclined, presenting a cooperative surface 28. In the assembled relationship of the two members (FIGURE 1) the surfaces 26 and 28 abut in a plane represented by the line L—L.

Figure 4:
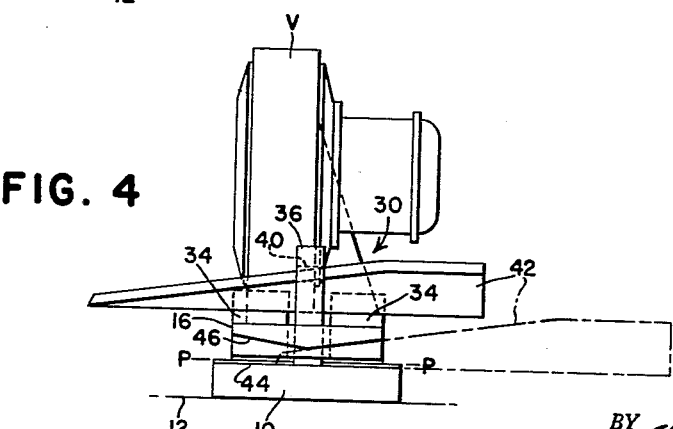
FIGURE 4 is an end view of the assembled structure as shown in FIGURE 1, the portion shown in dotted lines representing the use of the wedge element for separating the two members.

As will be clear, the abutment means 20 is at one end of the assembled structure. At the other end is provided clamp means, designated in its entirety by the numeral 30. The components of the clamp means include, in the member 16, an opening or slot 32 which runs lengthwise of the member. Integrally formed with the member 16 are a pair of ramp means 34 which lie along side of or border the opening 32 at opposite sides (FIGURES 4 and 5). The surface of each ramp means 34 is inclined upwardly or outwardly away from the plane of the surface pads 18, 18 and toward the abutment means 20, the purposes of which will presently appear.

Another part of the clamp means includes, rigid on the member 10, an eye element 36 which projects upwardly from the common plane of the pads 14, 14 and which is so dimensioned as to be receivable through the opening 32 in the member 16. The vertical dimension of the eye 36 is such that it projects considerably beyond the ramp means 34. This eye is provided with an inclined slot 38 having of course opposite closed ends, the upper one of which, at 40, is spaced from the ramp means 34 along a line perpendicular to the plane of the ramp means, as indicated by the line A—A in FIGURE 1.

A third part of the clamp means includes a wedge element 42 shaped as best shown in FIGURES 4 and 5. This wedge element is receivable between the ramp means 34 and the closed end 40 of the slot 38 in the eye 36 and when the wedge is driven tightly into place, as by manual force derived from a sledge or the like, the convergent surfaces of the wedge operate between the ramp means 34 and the closed end 40 of the slot to create components of force operative to tighten the engagement between the members 10 and 16, not only in the common plane P—P but also in the plane represented by the line L—L at the abutment means 20. In other words, when the two members are assembled, the member 16 is positioned with its abutment element 24 in engagement with the abutment element or lip 22 on the member 10, the two elements meeting as aforesaid in the plane of the line L—L. The opening 32 in the members 16 receives the eye 36. The length of the opening 32 is of course greater than that of the eye and it will be seen that, therefore, the two members are capable of having relative movement, in one direction toward the abutment means 20 and in the other direction toward the clamp means 30. The abutment means 20 of course limits or stops movement in the first direction and the clamp means is operative, when the wedge element 42 is driven into place, to create forces tending to move the member 16 along the plane P—P in the first direction, or against the stop created by the abutment means. It will be seen that the angle of the plane L—L is acute as respects that of the plane P—P, and there is therefore developed a component tending to tighten the engagement between the two surfaces 14, 14 and 18, 18 in the plane P—P. Implementing components are developed in the clamp means 30, because of the inclination of the ramp means 34 which, as said above, is outwardly away from the plane P—P and in the first direction, or toward the abutment means 20.

When the wedge means is left in place, a rigid composite joint is effected between the members 10 and 16 and a vibrator carried by the member 16, as at V, is adequately mounted for use in facilitating the handling of materials in the object to which the member 10 is affixed, as at 12. The vibrator may be of any suitable construction, typical of which is that shown in applicant's copending application Serial No. 836,768, filed August 28, 1959, now Patent No. 3,076,346. Any suitable means may be used to affix the vibrator V to the member 16, as by welding at W, implemented by a welded brace or gusset B. These details, however, are not important, it being significant only that some means be provided for carrying the vibrator rigidly on the member 16.

It will be seen from FIGURE 5 that the line of force exerted lengthwise of the assembled members is generally represented by C—C. The planes at L—L are, as respects their relationship to the line C—C, perpendicular to this line, as at D—D. Thus, operation of the clamp means 30 is such as to apply these forces uniformly throughout the member so as to effect the composite engagement in the planes P—P and L—L as already noted.

Another feature of the invention is that the wedge element 42 may be used to facilitate separation of the members 10 and 16 when it is desired to remove the member 16 and attach vibrator V for use elsewhere. For this purpose, the upper portion of the member 10 in the vicinity of the eye 36 is provided as what may be regarded as one of a pair of separating elements 44. The proximate portion of the other member 16 is cut away at 46 so that when the two members are assembled, the portions 44 and 46 leave a space into which the wedge element may be inserted as best shown in broken lines in FIGURE 4. It is preferable that the cut-away at 46 presents a pair of angularly related surfaces so that the boundaries of the space conform to the convergent related edges of the wedge 42. A few blows of a sledge on the wedge 42 will easily effect separation of the two members.

In that form of the invention shown in FIGURES 6 and 8, the same general principles are exploited in a somewhat different fashion. In this case, a mounting member 50 is adapted, like the mounting member 10, to be rigidly affixed to an object etc. to be vibrated as at 12'. Cooperative with the member 50 is a base member 52, and these two members respectively have cooperating pads meeting at a common plane P'—P', thus substantially duplicating the relationship between the members 10 and 16 as respects the plane P—P. This structure has clamping means 30' involving the same elements as those previously described. For purposes of ready identification, these are referred to as the wedge element 42', the ramp means 34', and the eye 36' having the slot 38', there being an opening 32' in the member 52 for receiving the eye 36'.

One difference in the structure of FIGURES 6 and 7 as compared to that of FIGURES 1 through 5 is that in FIGURES 6 and 7 there are provided a pair of abutment means 20' and 20'. However, when the clamping means is operated to develop a force along a line E—E in the plane P'—P', a tightening effect occurs at both abutment means 20', 20', but here each abutment means includes cooperative elements meeting at convergent lines F—F, F—F, which lines converge relative to the line E—E, with the direction of convergence being in the direction of the abutment means, or to a point beyond the abutment means. Here, as in the case of FIGURES 1 through 5, each abutment means comprises cooperative elements, here designated as 22' and 24'. Hence, not only does each abutment means have the acutely angular relationship identical to that at L—L in FIGURE 1, but also has the additional angle represented by the line F—F. There is thus a composite clamping action effected which not only tightens both abutment means 20', 20', but also increases the engagement between the members 50 and 52 in the plane P'—P'. Also the members 50 and 52 are provided respectively with cooperating portions 44' and 46' which receive the wedge element 42' when it is removed from the slot 38', being capable of being inserted between the portions 44' and 46' for effecting separation of the members 50 and 52. A vibrator, such as that shown at V' is mounted on the member 52 in similar fashion to the mounting provided in FIGURES 1 through 5, it being understood here, as it was there, that the details of the vibrator are not significant, nor are the methods by which the same is mounted on the base member. FIGURE 8 illustrates a variation of the mount in which the ramp means and abutment means are reversed as respects a pair of cooperative members such as a mounting member 60 and a base member 62, the former being capable of being mounted on an object to be vibrated, as at 12a and the latter being capable of carrying a vibrator as at Va. The abutment means, designated generally at 29a cooperates with clamping means 30a to achieve the same effects as noted before. Here, however, the angle of inclination of the surfaces that meet along a line L'—L' is inclined in the opposite direction, because here the lip 22a is provided on the base member and the comparable portion 24a is provided on the mounting member. This necessitates a reversal of the angle of inclination of the ramp means 34a. However, the end results are the same. It will be clear that the clamp means 30a includes the elements previously described, referred to here generally for purposes of identification as the wedge element 42a which is receivable in the slot 38a of the eye 36a, the eye of course passing through the opening 32a in the member 62. As in the two previous instances, the members 60 and 62 may be provided respectively with cooperative portions, as at 44a and 46a for enabling employment of the wedge 42a for separating the two members.

It will be seen from the foregoing that in all forms of the invention a simple and inexpensive expedient is provided for rigidly but removably securing together a mounting member and a base member, the former being affixable to an object to be vibrated and the latter being capable of carrying the vibrator for transmitting forces through the interconnected members to the object to be vibrated. The clamping facility is simple, residing entirely in cooperative surfaces forced together by action of the wedge element which may be easily driven into and out of place, as by a sledge. Conversely, the same wedge element may be employed to effect separation of the members. Features and advantages other than those enumerated will readily occur to those versed in the art, as will many modifications and alterations in the preferred embodiments disclosed, all of which may be achieved without departure from the spirit and scope of the invention.

What is claimed is:

1. A vibrator mounting, comprising: a pair of juxtaposed members respectively having surface portions meeting at a common plane for relative movement along said plane in first and second opposite directions, one of the members being a mounting member adapted to be affixed to an object to be vibrated and the other member being a base member adapted to carry a vibrator; abutment means including cooperative elements respectively rigid on the members and interengaging at an angle to said plane to stop relative movement of the members in said first direction; and clamp means operative to tighten engagement between said members both at said abutment means and in said common plane, including an opening in one member at said plane, ramp means on said one member alongside said opening and inclined away from said plane and in said first direction, an eye element rigid on the other member and projecting through said opening and beyond the ramp means, said eye element having a slot therein generally normal to the ramp means and presenting a closed end spaced outwardly from said ramp means, and a wedge element receivable in the slot to act between said closed end of the slot and the ramp means to create components of force drawing said surfaces together and increasing engagement between the abutment elements.

2. The invention defined in claim 1, in which: the angle of engagement between the abutment elements is acute to the common plane and inclined in said second direction to implement the forces created by the clamp means.

3. The invention defined in claim 1, including: separating means for releasing engagement between the members, including spaced apart opposed separating elements respectively rigid on the members and receivable of the wedge element when said wedge element is withdrawn from the slot, said wedge element acting between said separating elements to spread the members apart for separating said meeting surfaces.

4. A vibrator mounting, comprising: a pair of juxtaposed members respectively having surface portions meeting at a common plane for relative movement in a straight-line path along said plane in first and second opposite directions, one of the members being a mounting member adapted to be affixed to an object to be vibrated and the other member being a base member adapted to carry a vibrator; a pair of abutment means spaced apart transversely to said path, one at each side of said path, each abutment means including cooperative elements respectively rigid on the members and interengaging at an angle to said plane to stop relative movement of the members in said first direction; and clamp means operative to tighten engagement between said members both at said abutment means and in said common plane, including an opening in one member at said plane, ramp means on said one member alongside said opening and inclined away from said plane and in said first direction, an eye element rigid on the other member and projecting through said opening and beyond the ramp means, said eye element having a slot therein generally normal to the ramp means and presenting a closed end spaced outwardly from said ramp means, and a wedge element receivable in the slot to act between said closed end of the slot and the ramp means to create components of force drawing said surfaces together and increasing engagement between the abutment elements.

5. The invention defined in claim 4, in which: the angle of engagement between the abutment elements in each abutment means is acute to the common plane and inclined in said second direction to implement the forces created by the clamp means.

6. The invention defined in claim 4, in which: the abutment means are transversely convergent relative to said path and in said first direction and the clamp means is disposed generally in said path.

7. The invention defined in claim 6, in which: the abutment elements in each abutment means are further angled acutely to said plane and inclined in said second direction to implement the forces created by the clamp means.

8. A vibrator mounting, comprising: a mounting member adapted to be affixed to an object to be vibrated and having an outer surface; a base member having means for carrying a vibrator and including a surface engaging said mounting member surface to carry said base member on said mounting member for movement back and forth in first and second opposite directions; abutment means including cooperative elements, one on each member, interengageable at an angle to said surfaces to limit movement of said base member in said first direction; and clamp means spaced along said surfaces from the abutment means in said second direction and including a ramp element on the base member inclined outwardly away from said surfaces and in said first direction, a reaction element on the mounting member and spaced outwardly from the ramp element and a wedge element inserted between said ramp and reaction elements to create components of force causing tighter engagement between both said abutment elements and said surfaces.

9. The invention defined in claim 8, in which: the angle of engagement of said abutment elements is acute as respects said surfaces and generally normal to the angle of the ramp element so as to implement the component of force causing tighter engagement between said surfaces.

References Cited in the file of this patent
UNITED STATES PATENTS

| | | |
|---|---|---|
| 717,226 | Liebich | Dec. 30, 1902 |
| 2,631,800 | Pinkston | Mar. 17, 1953 |
| 2,635,844 | Sato | Apr. 21, 1953 |